US009719885B2

(12) United States Patent
Deleeuw et al.

(10) Patent No.: US 9,719,885 B2
(45) Date of Patent: Aug. 1, 2017

(54) TEST ARRANGEMENT FOR THE CRASH SIMULATION OF MOTOR VEHICLES (71) Applicant: ILLINOIS TOOL WORKS INC., Glenview, IL (US)

(72) Inventors: Michael Deleeuw, Darmstadt (DE); Wolfgang Brendel, Modautal (DE); Heike Kern, Modautal (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 256 days.

(21) Appl. No.: 14/442,742

(22) PCT Filed: Dec. 6, 2013

(86) PCT No.: PCT/US2013/073498
§ 371 (c)(1),
(2) Date: May 14, 2015

(87) PCT Pub. No.: WO2014/093149
PCT Pub. Date: Jun. 19, 2014

(65) Prior Publication Data
US 2015/0346061 A1 Dec. 3, 2015

(30) Foreign Application Priority Data
Dec. 14, 2012 (DE) .................... 10 2012 223 194

(51) Int. Cl.
*G01M 7/00* (2006.01)
*G01N 3/00* (2006.01)
(Continued)

(52) U.S. Cl.
CPC .............................. *G01M 17/0078* (2013.01)

(58) Field of Classification Search
None
See application file for complete search history.

(56) References Cited

U.S. PATENT DOCUMENTS 5,483,845 A * 1/1996 Stein ................ G01M 17/0078
73/12.01
5,929,348 A * 7/1999 Stein ...................... G01M 7/08
73/12.07
(Continued)

FOREIGN PATENT DOCUMENTS

DE  102005010189 B3  11/2006
DE  102007056572 A1   5/2009
WO    2004088270 A2  10/2004

OTHER PUBLICATIONS

ISR and WO for PCT/US2013/073498 mailed Apr. 25, 2014.

*Primary Examiner* — Peter Macchiarolo
*Assistant Examiner* — Jermaine Jenkins
(74) *Attorney, Agent, or Firm* — Hauptman Ham, LLP (57) ABSTRACT

The present invention relates to a test arrangement for the crash simulation of motor vehicles, said test arrangement having a first carriage, which is movable substantially horizontally along a longitudinal axis, and a second carriage, which is movable along the longitudinal axis together with the first carriage, wherein the second carriage is attached to the first carriage in such an articulated manner that the second carriage is movable with respect to the first carriage. In order to be able to simulate actual accident conditions better, in the test arrangement according to the invention, in addition to at least one first actuating element and at least one second actuating element, there is also provided at least one third actuating element, which is configured to accelerate the second carriage in a horizontal direction substantially perpendicular to the longitudinal axis.

15 Claims, 7 Drawing Sheets (51) Int. Cl.
  *G01N 3/08* (2006.01)
  *G01N 3/30* (2006.01)
  *G01M 17/007* (2006.01)

(56) References Cited

U.S. PATENT DOCUMENTS

| | | | |
|---|---|---|---|
| 9,488,546 B2 * | 11/2016 | Covic | G01M 17/0078 |
| 2004/0230394 A1 | 11/2004 | Saari et al. | |
| 2007/0018511 A1 * | 1/2007 | Schulz | G09B 9/042 |
| | | | 73/118.01 |
| 2011/0192241 A1 * | 8/2011 | Aiki | G01M 17/0078 |
| | | | 73/865.3 |

* cited by examiner

TEST ARRANGEMENT FOR THE CRASH SIMULATION OF MOTOR VEHICLES

RELATED APPLICATIONS

The present application is a National Phase of International Application Number PCT/US2013/073498 filed Dec. 6, 2013 and claims priority to German Application Number 10 2012 223 194.3 filed Dec. 14, 2012.

The present invention relates to a test arrangement for the crash simulation of motor vehicles. In particular, this is a test arrangement for the crash simulation of motor vehicles which allows a movement simulation in all three spatial directions.

A test arrangement for the crash simulation of motor vehicles which is known from the prior art can be seen in document DE 10 2005 010 189 B3. As is precisely the case with the test arrangement according to the invention, the testing device known from DE 10 2005 010 189 B3 works with what are referred to as "inverse crash testers", i.e. the deceleration arising in an actual collision of a motor vehicle is converted into a reverse acceleration of the test assembly. This prevents a complete vehicle from having to be destroyed in each case in the crash simulations which are necessary for improving vehicle safety. Specifically, a vehicle body (test assembly) is attached to a carriage, said vehicle body being moved in the longitudinal direction at a reverse acceleration corresponding to the deceleration which arises in an actual collision of the motor vehicle. The forces arising here correspond to the largest possible extent to the forces which arise in an actual accident.

In order to achieve a simulation of accident situations which is as real as possible, it has already been proposed in the prior art to superimpose a vertical acceleration on the controlled longitudinal acceleration of the test arrangement. On account of the application of vertical accelerations onto the carriage arrangement, the simulation of rear-end collisions is improved, since a rotating movement about a transverse axis of the motor vehicle can be replicated. The angle resulting for a rotation about the aforementioned rotation axis is described in the prior art as pitch angle. As can be seen from DE 10 2005 010 189 B3, the known test arrangements often comprise first and second carriages arranged so as to lie above one another, which carriages are coupled to one another in an articulated manner. The second carriage here is usually provided with the test assembly, that is to say the vehicle body which is to be examined.

In the conventional test arrangements it is considered to be problematic that while, besides the longitudinal acceleration, they do also provide a vertical acceleration for the simulation of the pitch angle of the vehicle, other movement profiles, such as for example yawing (rotation of the test assembly about a vertical axis), are not considered. Such yawing of the motor vehicle arises in particular in accident situations in which the motor vehicle does not impact an obstacle fully head-on. Thus, the yawing movement in an actual impact with an obstacle and the forces on the driver caused as a result are not detected in the test arrangements known from the prior art, on account of which the conventional test arrangements regularly cannot be used to simulate all forces arising in an actual crash.

On the basis of the problem mentioned above, the present invention is based on the object of providing a test arrangement for the crash simulation of motor vehicles which enables an improved simulation of the accident forces arising in the real case.

According to the invention, this object is achieved by the characterizing part of independent patent claim 1.

Accordingly, the test arrangement according to the invention has at least one third actuating element which is configured to accelerate the second carriage in a horizontal direction substantially perpendicular to the longitudinal axis.

The test arrangement according to the invention has a multiplicity of advantages. Thus, as a result of the third actuating element, not only can a pitch movement, in addition to the acceleration in the longitudinal direction, be applied to the vehicle but also a yaw movement can be simulated. To this end, a force component is introduced into the test assembly horizontally and perpendicularly to the longitudinal axis by the third actuating element. Depending on the arrangement of the at least third actuating element with respect to the test assembly, multifaceted vehicle kinematics can thus be simulated. Besides a yaw movement, a side impact, as can be caused by a lateral collision with another road user, is accordingly conceivable. In other words, with the test arrangement according to the invention, not only movements in the longitudinal direction or in the vertical direction of the test assembly can be simulated; rather, lateral movements, i.e. movements in the horizontal direction perpendicular to the longitudinal axis, can also be imitated. As already indicated above, far more realistic simulations can be carried out in this manner.

Advantageous refinements of the test arrangement according to the invention can be gathered from the dependent claims.

Thus, it is provided in a first refinement of the test arrangement according to the invention that the at least one second actuating element is connected to the second carriage such that the second carriage is rotatable about a transverse axis perpendicular to the longitudinal axis by activating the second actuating element. To this end, the at least one second actuating element may be arranged, for example, on the front or rear end region of the second carriage such that, when the second actuating element is actuated, said carriage is tipped toward the front or the rear and consequently carries out a pitch movement, i.e. a rotation movement, about a transverse axis perpendicular to the longitudinal axis. As will be explained in more detail later, it may be provided in particular that the test arrangement to this end has a plurality of second actuating elements which are connected to the second carriage at different positions such that the second carriage is rotatable about different horizontal axes.

In a similar way, it may be furthermore provided that the at least one third actuating element is connected to the second carriage such that the second carriage is rotatable about a vertical axis of the second carriage by activating the at least one third actuating element. Besides a side impact, it is consequently possible to also simulate the abovementioned yaw movement of a crash situation in a particularly simple manner on account of the at least one third actuating element. Depending on the arrangement of the at least one third actuating element with respect to the second carriage, different rotation movements can thus be applied to the test assembly.

According to a further realization of the test arrangement according to the invention, the at least one second actuating element is arranged next to the first and second carriages such that the at least one second actuating element remains in its position while the first and the second carriages are accelerated along the longitudinal axis by the at least one first actuating element. In other words, the at least one second actuating element is, in fact, preferably not situated on the first or second carriage of the test arrangement but in a stationary manner next to the two carriages. In this way, the weight of the carriage arrangement of first and second carriage is significantly reduced, as a result of which far higher acceleration values can be achieved. Consequently, also accident situations with higher forces can be simulated by the test arrangement according to the invention. Moreover, the stress on the test arrangement during the simulation is decreased on account of the decrease in the carriage weight. The reason for this lies in particular in the fact that in the case of a lighter carriage, lower forces are applied to the system.

Alternatively or additionally to the abovementioned arrangement of the at least one second actuating element next to the first and second carriages, it may also be provided according to the invention that the at least one third actuating element is arranged next to the first and second carriages such that the at least one third actuating element remains in its position while the first and second carriages are accelerated along the longitudinal axis by the at least one first actuating element. Of course, this also results in a weight reduction of the carriage arrangement of first and second carriage, as a result of which the abovementioned advantages are achieved. It is particularly preferred here to arrange the at least one second actuating element and the at least one third actuating element next to the first and second carriage, since a maximum weight reduction of the carriage arrangement can be achieved as a result. Nevertheless, it is also conceivable for merely the at least one second or third actuating element to be arranged next to the first and second carriage, while the at least one third or second actuating element is arranged on the first or second carriage.

According to a further aspect of the test arrangement according to the invention, the at least one second and the at least one third actuating element are connected to the second carriage via at least one guide rail. The at least one guide rail extends here substantially parallel to the longitudinal axis of the first carriage. In this way, the acceleration forces of the at least one second and third actuating elements are transmitted via the at least one guide rail to the second carriage of the test arrangement. Thus, the vertical and lateral accelerations can be introduced into the carriage arrangement without compromising the movement of the carriages in the longitudinal direction. Furthermore, as a result of the guide rails, the carriage arrangement in connection with the test assembly can be guided in a controlled manner at every point in time of the crash simulation. Thus, unexpected movements of the test arrangement can be prevented, as a result of which the safety of the operating personnel is significantly improved.

According to a further implementation, it may in particular be provided that the at least one second actuating element is connected to the at least one guide rail and configured to accelerate the at least one guide rail in a substantially vertical direction with respect to the first carriage. Accordingly, the vertical acceleration forces of the at least one second actuating element are applied to the second carriage of the test arrangement via the at least one guide rail. Depending on the arrangement of the guide rail with respect to the second carriage, it is thus possible in a particularly simple way to generate a pitch movement of the second carriage with respect to the first carriage. In order to enable a particularly fast application of the vertical acceleration forces, it may be provided, for example, that a plurality of guide rails (e.g. two) are arranged on each side of the second carriage and are each connected to a second actuating element such that vertical deflections of the second carriage can be achieved in a mutually independent manner.

In an equivalent manner thereto, the at least one third actuating element may also be connected to the at least one guide rail and configured to accelerate the at least one guide rail in a horizontal direction substantially perpendicular to the longitudinal axis. Of course, it is also conceivable here for a multiplicity of the actuating elements to be connected to a corresponding number of guide rails in order to initiate the yaw movements already mentioned above.

According to the abovementioned exemplary embodiment, the second and third actuating elements may be connected to the second carriage in each case via the guide rails. To this end it is conceivable, for example, for the second and third actuating elements in each case to be directly connected, independently of one another, to the guide rail. Alternatively thereto, it is also conceivable for merely the at least one second actuating element to be connected to the guide rail, while the at least one third actuating element acts directly on the at least one second actuating element and thus is indirectly connected to the guide rail via the at least one second actuating element. In an equivalent manner thereto, it is, of course, also conceivable for the third actuating element to be directly connected to the at least one guide rail, while the at least one second actuating element is indirectly connected to the at least one guide rail via the at least one third actuating element.

The at least one first actuating element, the at least one second actuating element and the at least one third actuating element preferably each have at least one hydraulic, pneumatic or electric actuating cylinder. In this way, the desired acceleration forces can easily be generated in the test arrangement. Of course, it is also possible to use any other suitable operating principle for applying the acceleration forces to the carriage arrangement of the test arrangement according to the invention.

According to a further embodiment of the test arrangement according to the invention the second carriage is connected to the first carriage in an articulated manner via a push rod, wherein the push rod is configured to transmit the acceleration of the first actuating element along the longitudinal axis from the first carriage to the second carriage. The push rod may be connected here in each case to the first or second carriage via a ball joint or universal joint such that the acceleration of the first actuating element can be transmitted from the first carriage to the second carriage while the second carriage is substantially freely movable with respect to the first carriage. In other words, the acceleration forces of the second and third actuating elements can be applied to the second carriage independently of the longitudinal movement of the carriage arrangement in order to move the second carriage with respect to the first carriage. Specifically, the second carriage may as a result experience an acceleration in the vertical direction or in the lateral direction (i.e. perpendicular to the longitudinal direction) during the movement in the longitudinal direction. Of course, the carriage is coupled here at all times to the first carriage by the push rod and can therefore not carry out any unexpected movements.

In this context it should be further mentioned that the push rod and/or the second carriage can be connected to a brake device for decelerating a longitudinal or lateral movement of the second carriage with respect to the first carriage after the end of the crash simulation. As a result, the safety of the test arrangement according to the invention is further enhanced. Furthermore, on account of the brake device, the return of the second carriage into its starting position with respect to the first carriage can also be realized.

According to a further aspect of the test arrangement according to the invention, a third carriage may furthermore be provided which is configured to brake the movement of the second carriage after the end of the crash simulation. The third carriage is arranged here in such a way with respect to the first and second carriages that at the start of the crash simulation it is not connected to the first and second carriages and only becomes operatively connected to the first and second carriages at the end of the crash simulation. In other words, the third carriage may be situated behind the carriage arrangement of first and second carriage in the longitudinal direction. For example, the third carriage may be arranged here on the same carriage arrangement as the first carriage, the third carriage initially being at a distance from the carriage arrangement of first and second carriage. Only after the crash simulation has been carried out, i.e. after the acceleration in the longitudinal direction has ended, does the third carriage become operatively connected to the first and second carriages in order to brake the latter two.

It may be additionally provided that the third carriage is configured to transfer the two carriages into their starting position after the end of the crash simulation. Accordingly, the third carriage may be used not only to brake the carriage arrangement of first and second carriage after the end of the crash simulation; rather, a return of the test arrangement by the third carriage is also conceivable.

In order to reduce the weight of the carriage arrangement of first and second carriage even further, it is provided according to another implementation that the first and second carriages are produced mainly from aluminum. As a result of this, in turn higher acceleration values are achieved and the loads within the test arrangement are effectively reduced.

In the following detailed description of the figures, the test arrangement according to the invention for the crash simulation of motor vehicles is described in more detail by means of the embodiment illustrated in the figures, in which:

FIG. 1b shows a plan view onto the embodiment of the test arrangement according to the invention shown in FIG. 1a;

FIG. 1c shows a side view of the first embodiment of the test arrangement according to the invention shown in FIG. 1a;

FIG. 1d shows a view from the rear onto the embodiment of the test arrangement according to the invention illustrated in FIG. 1a;

FIG. 2b shows a plan view onto the image illustrated in FIG. 2a;

FIG. 3b shows a plan view onto the image illustrated in FIG. 3a.

In the following detailed description of the figures, identical or operatively identical components are provided with identical reference signs for reasons of clarity.

A specific embodiment of the test arrangement according to the invention for the crash simulation of motor vehicles can be gathered from FIGS. 1a to 3b. Specifically, the test arrangement is shown in its starting position, i.e. prior to the start of the crash simulation, in FIGS. 1a to 3b. As already mentioned above, the test arrangement has a first carriage 11 which is movable substantially horizontally along a longitudinal axis A. The first carriage 11 is preferably guided here in the direction of the longitudinal axis A by rail elements 111, 112, which are situated on the underside of the first carriage 11. Of course, the first carriage 11 does not have to be guided by two rail elements 111, 112; rather, it is also conceivable to move the carriage with any other guide, for example in a levitating manner above a magnetic guide along the longitudinal axis A.

A second carriage 12 is attached to the first carriage 11 in such an articulated manner that the second carriage 12 is movable with respect to the first carriage 11. Here, the second carriage 12 is movable in particular together with the first carriage 11 along the longitudinal axis A. In other words, the second carriage 12 is connected to the first carriage 11 such that the movement of the first carriage 11 along the longitudinal axis A can be transmitted to the second carriage 12, while at the same time a movement, which is as free as possible, of the second carriage 12 with respect to the first carriage 11 is enabled. By means of FIGS. 1b and 1d, it is very easily discernible that the aforementioned connection between the first carriage 11 and the second carriage 12 is preferably achieved by a push rod 18 which is connected via in each case one articulation arrangement (e.g. a ball joint or universal joint) 181, 182 to the first or second carriage 11, 12.

In order to enable the movement of the first and second carriage 11, 12 along the longitudinal axis A, at least one first actuating element 13, which is configured to accelerate the first and second carriage 11, 12 along the longitudinal axis A, is provided on the test arrangement according to the invention. The at least one first actuating element may be, for example, a servo cylinder which is known from the prior art and which is controlled via a multi-stage servo valve connected to a piston accumulator unit. As a result, the acceleration can be transmitted according to a setpoint input via the piston 131 (FIG. 2a), which is mounted in the servo cylinder, to the first carriage 11.

Figure 1A:
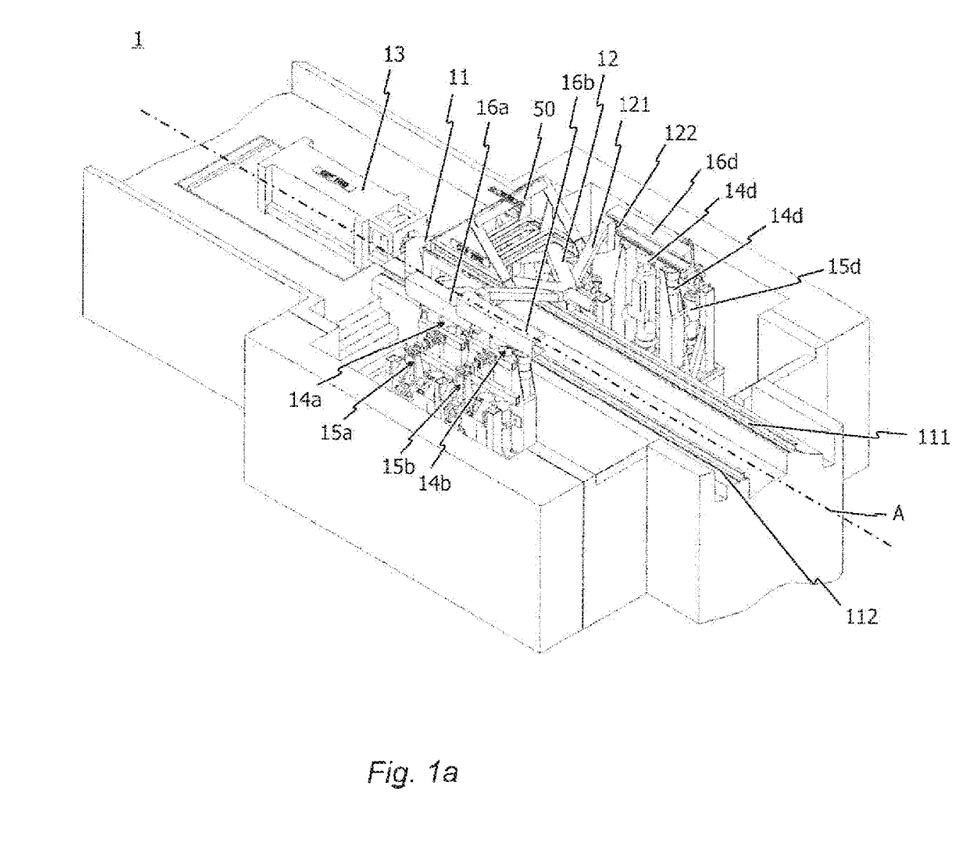
FIG. 1a shows a perspective view of a first embodiment of the test arrangement according to the invention in the starting position.

Moreover, at least one second actuating element 14a, 14b, 14c, 14d can be gathered from FIG. 1a, which second actuating element is configured to accelerate the second carriage 12 in a substantially vertical direction with respect to the first carriage 11. As is shown, it is preferably provided that the test arrangement has in particular four second actuating elements 14a, 14b, 14c, 14d which each have three hydraulic actuating cylinders which serve for acceleration in the vertical direction. As will be explained in more detail later, the in each case three hydraulic actuating cylinders of the four second actuating elements 14a, 14b, 14c, 14d are for this purpose connected to the second carriage 12 via in each case one guide rail 16a, 16b, 16c, 16d.

In addition to the at least one, in particular four, second actuating elements 14a, 14b, 14c, 14d, the test arrangement according to the invention has at least one, in particular four, third actuating elements 15a, 15b, 15c, 15d which are configured to accelerate the second carriage in a horizontal direction substantially perpendicular to the longitudinal axis. The four third actuating elements 15a, 15b, 15c, 15d are thus designed to introduce a lateral movement into the second carriage such that the latter is also movable substantially perpendicularly to the longitudinal axis A. In the embodiment illustrated in the figures, the four third actuating elements 15a, 15b, 15c, 15d are connected in each case to the assigned second actuating elements 14a, 14b, 14c, 15d in order to introduce a force perpendicular to the longitudinal axis A via the guide rails 16a, 16b, 16c, 16d into the second carriage.

Figure 1B:
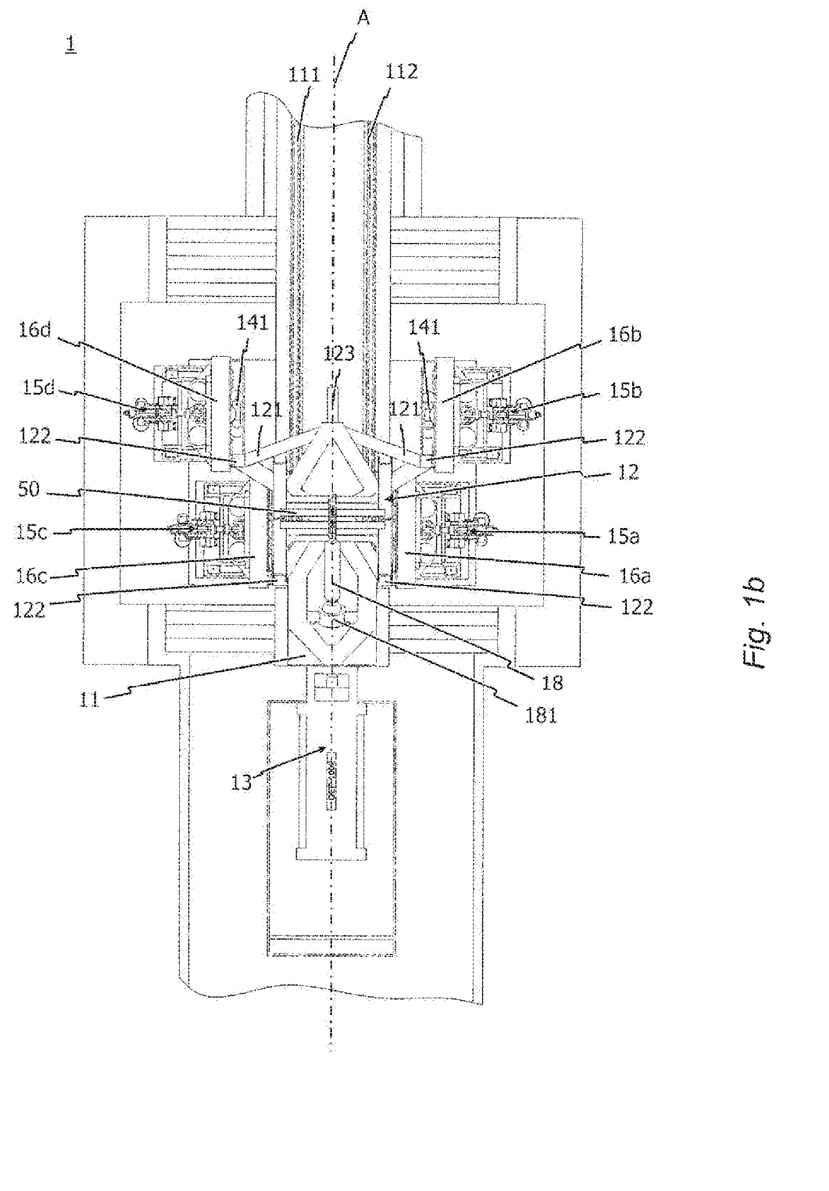
Figure 1C:
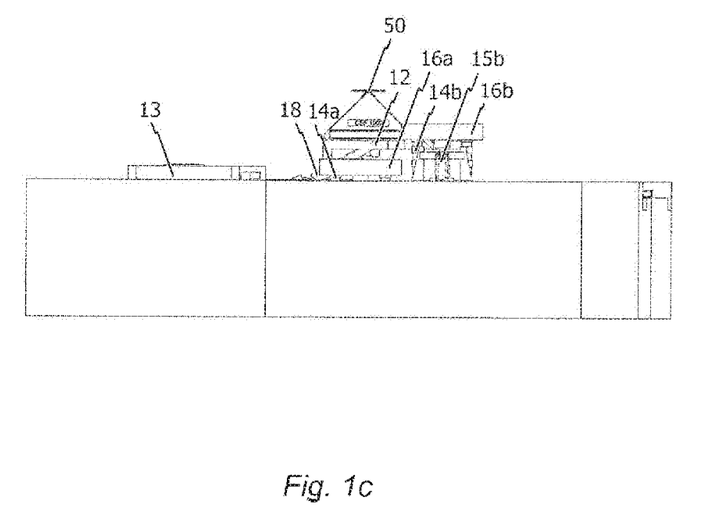
Figure 2A:
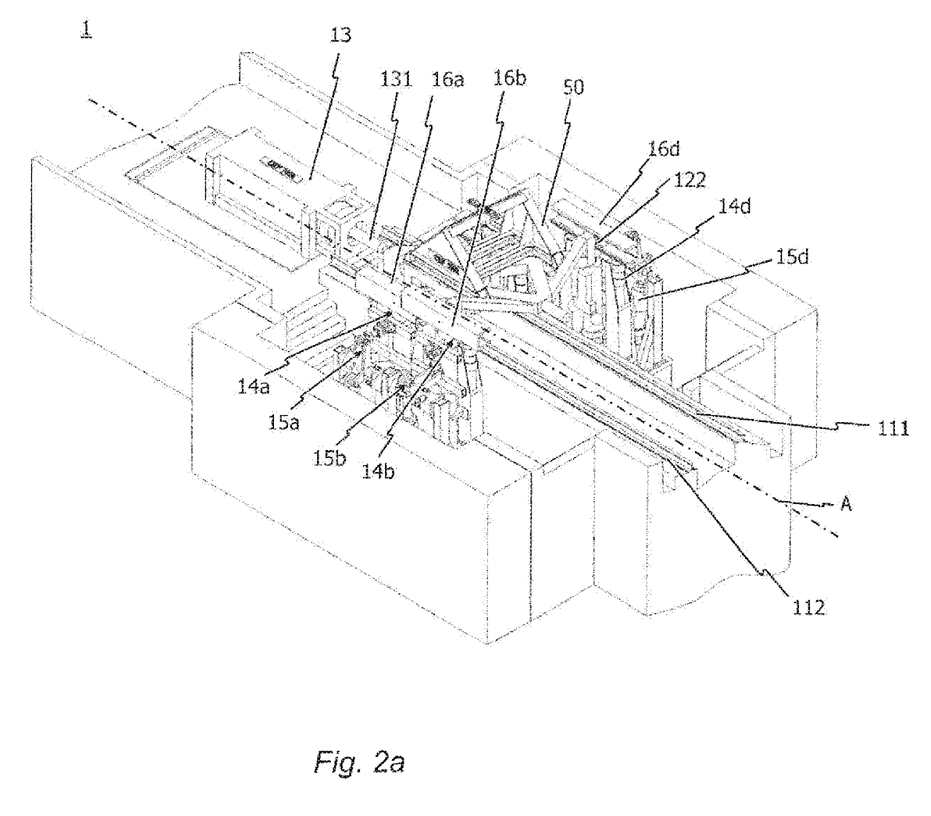
FIG. 2a shows a perspective view of the embodiment according to FIG. 1a after the completion of 50 percent of the crash simulation.
Figure 2B:
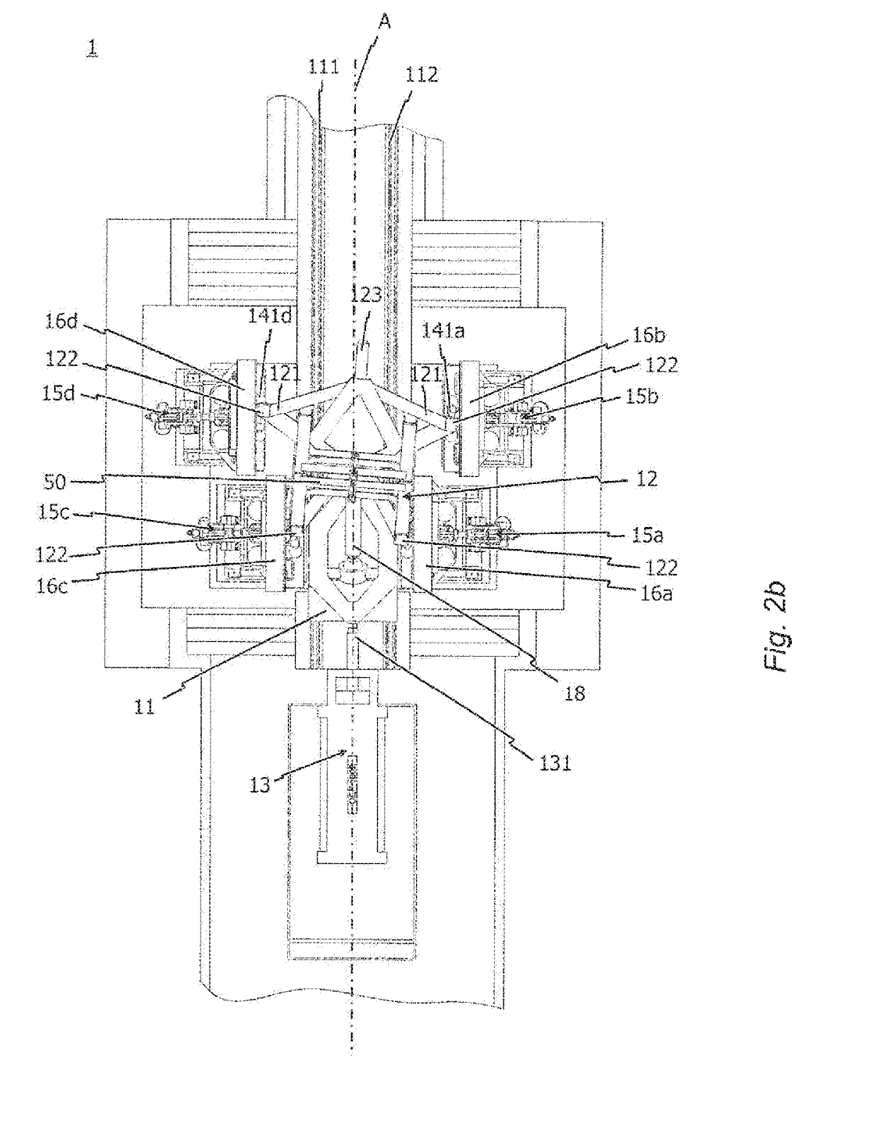
Figure 3A:
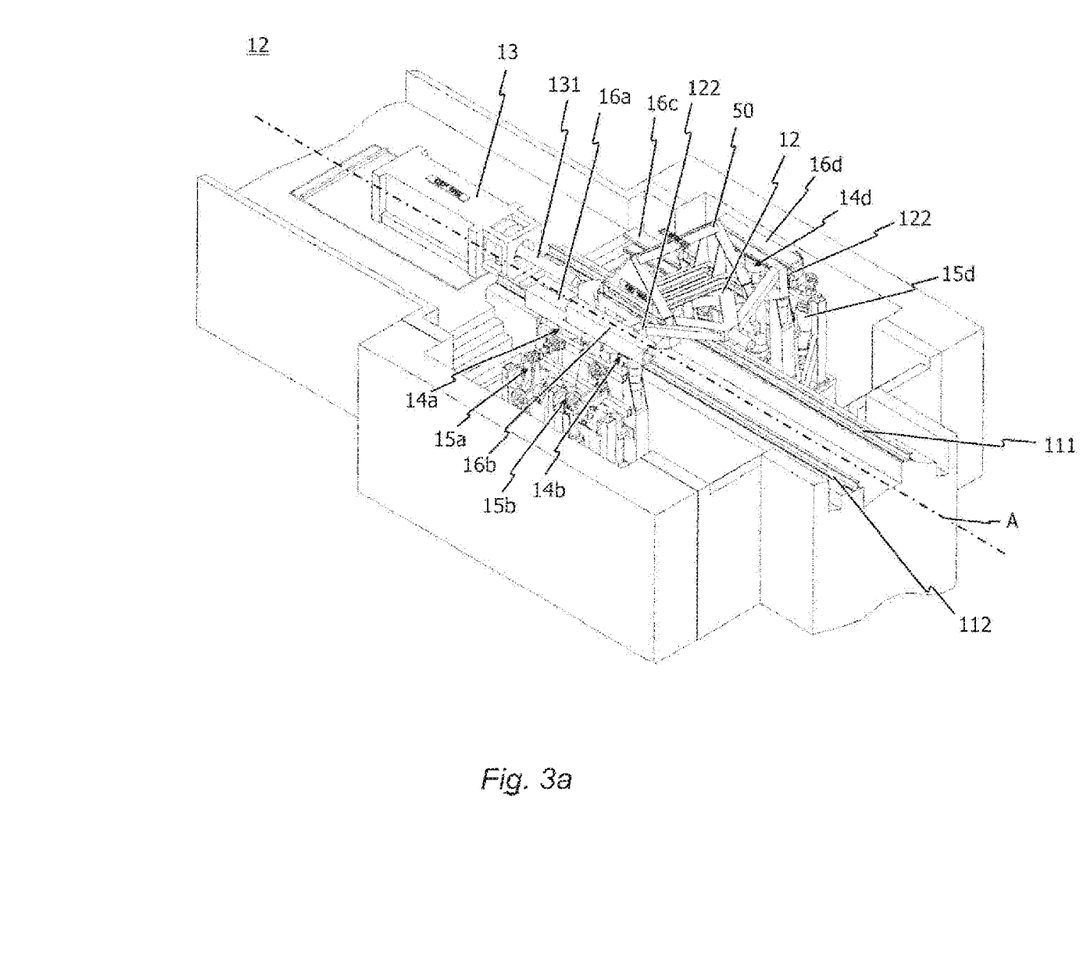
FIG. 3a shows a perspective view of the embodiment according to FIG. 1a at the end of the crash simulation.

A typical sequence of the crash simulation with the test arrangement according to the invention results from a comparison of FIGS. 1a, 2a and 3a, or 1b, 2b and 3b, which in each case show the test arrangement at different points in time in the sequence of the crash simulation. Specifically, FIG. 1a illustrates the test arrangement in the starting position, while FIG. 2a reproduces a point in time which corresponds to 50 percent of the crash simulation. FIG. 3a, by contrast, reveals the position of the test arrangement after the end of the crash simulation. By comparison of FIGS. 1a, 2a and 3a, it is immediately discernible that the movements of the actuating elements 13, 14a, 14b, 14c, 14d, 15a, 15b, 15c, 15d progress in a mutually synchronized manner such that a simultaneous application of the individual acceleration forces takes place. In the illustrated exemplary embodiment, besides the acceleration along the longitudinal axis A, an acceleration of the second carriage in the vertical direction and also in the lateral direction is also applied to the carriage arrangement. A superimposition of the accelerations thus results, as a result of which, for example, pitch and yaw movements corresponding to the real case can be simulated.

At this point it should be mentioned that the second and third actuating elements 14a, 14b, 14c, 14d, 15a, 15b, 15c, 15d of course have to have a particular arrangement with respect to the first and second carriages 11, 12 in order to realize these pitch and yaw movements. In particular, it is accordingly provided that the at least one second actuating element 14a, 14b, 14c, 14d is connected to the second carriage 12 such that the second carriage 12 is rotatable about a transverse axis perpendicular to the longitudinal axis A by activating the at least one second actuating element 14a, 14b, 14c, 14d. More particularly, the test arrangement 1 has to this end the abovementioned four second actuating elements 14a, 14b, 14c, 14d which are attached at different points along the second carriage 12. Specifically, two second actuating elements 14a, 14b, or 14c, 14d are attached on each side of the second carriage. In each case one of the two second actuating elements 14a or 14c is attached here to a rear end region of the second carriage 12, while the other second actuating element 14b or 14d is connected to the front end region of the second carriage. Since each of the second actuating elements 14a, 14b, 14c, 14d is configured to apply a vertical acceleration to the second carriage, it is immediately apparent that said second carriage can be tipped at will about its center of gravity with the aid of the second actuating element 14a, 14b, 14c, 14b. It is, however, particularly preferable here to rotate the second carriage 12 about a vertical transverse axis (not illustrated) perpendicular to the longitudinal axis A by exclusive actuation of the rear second actuating elements 14a, 14c, or exclusive actuation of the front second actuating elements 14a, 14b, as a result of which the pitch movement already mentioned above is generated.

As is further discernible, the at least one third actuating element 15a, 15b, 15c, 15d is connected to the second carriage 12 such that the second carriage is rotatable about a vertical axis (not shown) of the second carriage 12 by activating the at least one third actuating element 15a, 15b, 15c, 15d. In particular, the four third actuating elements 15a, 15b, 15c, 15d are also connected to the rear regions, i.e. the corners, of the second carriage 12. Accordingly, a lateral movement can be introduced very simply into the second carriage 12. At the same time, this can be used to cause a rotation/yaw movement of the second carriage by a defined activation of the third actuating elements 15a, 15b, 15c, 15d. This may be achieved, for example, in that the two rear third actuating elements 15a, 15c are moved in a direction which is opposite to the direction of the front third actuating elements 15b, 15d. In the example according to FIG. 3b, the yaw movement has been created by the two rear third actuating elements 15a, 15c having been moved toward the left in the illustration, while the two front third actuating elements 15b, 15d have generated an acceleration toward the right. Consequently, the front end region of the second carriage 12 is pivoted toward the right, while the rear end region is moved toward the left. This produces a rotation movement, which is similar to a yaw movement in the case of an actual crash situation, about a vertical axis of the second carriage 12.

Figure 3B:
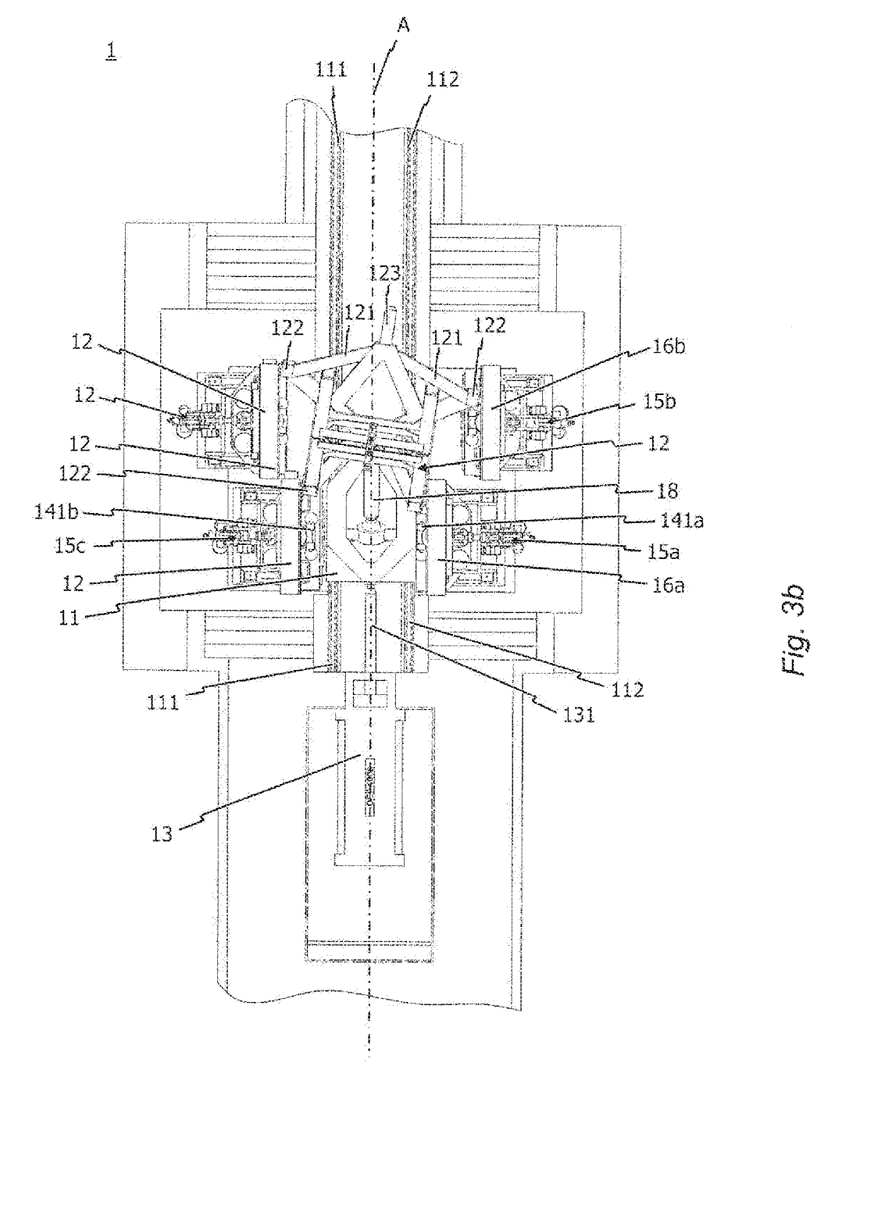

From the plan views according to FIGS. 1b, 2b and 3b it is very easily discernible that the second actuating elements 14a, 14b, 14c, 14d are arranged next to the first and second carriages 11, 12 such that the second actuating elements 14a, 14b, 14c, 14d remain in their position, while the first and second carriages 11, 12 are accelerated by the at least one first actuating element 12 along the longitudinal axis A. In an analogous manner to this, the third actuating elements 15a, 15b, 15c, 15d are also arranged next to the first and second carriage 11, 12. As a result the second and third actuating elements do not have to be moved with the carriage arrangement of first and second carriages 11, 12. On account of this, the weight of the carriage arrangement is significantly reduced, with the result that higher acceleration values can be achieved. Furthermore, the loads impinging on the test arrangement 1 are greatly reduced. The second and third actuating elements 14a, 14b, 14c, 14d, 15a, 15b, 15c, 15c accordingly cast in concrete in the subsurface next to the carriage arrangement, such that said actuating elements can absorb the forces applied to the carriage without problems.

Throughout the simulation sequence, the second carriage 12 is guided over at least one guide rail 16a, 16b, 16c, 16d. This is achieved, in particular, in that the second and third actuating elements 14a, 14b, 14c, 14d, 15a, 15b, 15c, 15d are connected to the second carriage 12 in each case via a single guide rail 16a, 16b, 16c, 16d, the guide rails 16a, 16b, 16c, 16d extending substantially parallel to the longitudinal axis A of the first carriage 12. For this purpose, the second carriage 12 has support elements 121 which have on their end regions guide elements 122 which are guidable in the guide rails 16a, 16b, 16c, 16d. This can be seen in particular from FIG. 1d, in which the C-shaped cross section of the guide rails 16a, 16b, 16c, 16d is illustrated. The guide elements 122 may have, for example, rollers here which are guided in the C-shaped guide rails and are connected to the support elements 121 in an articulated manner. The pitch and yaw movement of the second carriage can thus be compensated in a very simple way (FIG. 3b).

According to a particularly simple realization of the test arrangement according to the invention, the second actuating elements 14a, 14b, 14c, 14d are connected to the guide rails 16a, 16b, 16c, 16d and configured to accelerate the at least one guide rail in a substantially vertical direction with respect to the first carriage. In a similar way, the third actuating elements 15a, 15b, 15c, 15d are also connected to the guide rails 16a, 16b, 16c, 16d and configured to accelerate the guide rails 16a, 16b, 16c, 16d in a horizontal direction substantially perpendicular to the longitudinal axis A. In other words, this means that the acceleration forces of the second and third actuating elements 14a, 14b, 14c, 14d, 15a, 15b, 15c, 15d are applied to the second carriage 12 via the respective guide rail 16a, 16b, 16c, 16d. The guide rails 16a, 16b, 16c, 16d are thus moved in the vertical or lateral direction by the activation of the second and third actuating elements 14a, 14b, 14c, 14d, 15a, 15b, 15c, 15d.

Returning to FIG. 1d, it should be further mentioned in this context that the second actuating elements 14a, 14b, 14c, 14d may to this end be directly connected to the guide rails 16a, 16b, 16c, 16d, while the third actuating elements 15a, 15b, 15c, 15d are in connection with the guide rails 16a, 16b, 16c, 16d via the second actuating elements 14a, 14b, 14c, 14d. It is accordingly provided that the vertical acceleration forces of the second actuating elements 14a, 14b, 14c, 14d are directly introduced into the guide rail, while the lateral acceleration forces of the third actuating elements 15a, 15b, 15c, 15d are initially transmitted to the second actuating elements 14a, 14b, 14c, 14d which consequently move together with the guide rails 16a, 16b, 16c, 16d in the lateral direction. To this end, it is, of course, necessary that the second actuating elements 14a, 14b, 14c, 14d are movable to a certain extent in the lateral direction. In the present exemplary embodiment, this is achieved in particular by the pivot axes 141a, 141b, 141c, 141d (indicated in FIGS. 2b and 3b) of the second actuating elements 14a, 14b, 14c, 14d. Although this is not immediately discernible from the figures, the second actuating elements 14a, 14b, 14c, 14d can be pivoted in the lateral direction by said pivot axes 141a, 141b, 141c, 141d. The pivot axes 141a, 141b, 141c, 141d are preferably provided here on a lower end region of the second actuating elements 14a, 14b, 14c, 14d. In other words, the second actuating elements 14a, 14b, 14c, 14d are accordingly configured to be pivotable in the lateral direction with respect to the subsurface. Of course, it is likewise conceivable for the second actuating elements to be displaceable in translation in the lateral direction instead of carrying out the aforementioned pivot movement.

As already indicated, the second and third actuating elements 14a, 14b, 14c, 14d, 15a, 15b, 15c, 15d may each have a hydraulic, pneumatic or electric actuating cylinder. Of course, any other suitable actuating principle is also conceivable. As can be seen from FIGS. 1a, 2a, and 3a, the second actuating elements 14a, 14b, 14c, 14d may have in each case three actuating cylinders, while the third actuating elements 15a, 15b, 15c, 15d are equipped with one actuating cylinder. With respect to the third actuating elements 15a, 15b, 15c, 15d, it should be further mentioned that the actuating cylinders are preferably oriented vertically and are connected to the second actuating elements 14a, 14b, 14c, 14d via an articulation arrangement such that a vertical lift movement of the actuating cylinders is converted into a horizontal acceleration of the second actuating elements 14a, 14b, 14c, 14d substantially perpendicular to the longitudinal axis A. This produces a space-saving arrangement of the third actuating elements 15a, 15b, 15c, 15d, which can, moreover, be connected to the subsurface in a particularly stable manner. This also favors above all the dissipation of load by the second and third actuating elements 14a, 14b, 14c, 14d, 15a, 15b, 15c, 15d.

Figure 1D:
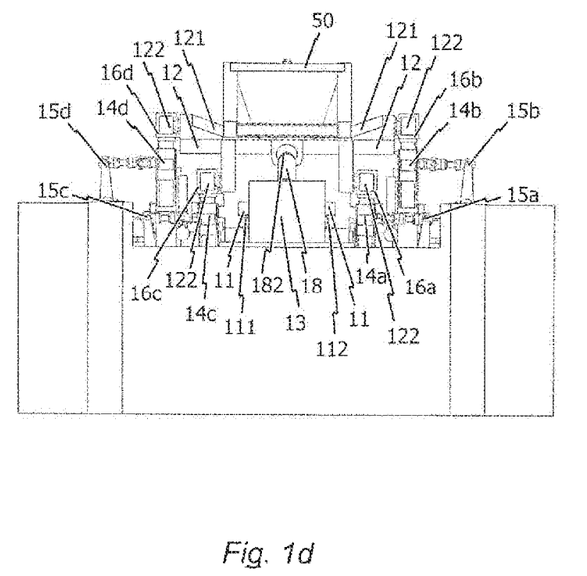

With regard to the plan views of FIGS. 1b, 2b and 3b, and also to the rear view in FIG. 1d, it should be mentioned that the second carriage 12 is preferably connected in an articulated manner to the first carriage 11 via a push rod 18. The push rod 18 is configured to transmit the acceleration of the first actuating element 13 along the longitudinal axis A from the first carriage 11 to the second carriage 12. At the same time, the push rod 18 is connected to the first and second carriages in each case via an articulation arrangement such that the second carriage 12 is substantially freely movable with respect to the first carriage 11. This enables the introduction of the vertical or lateral acceleration forces into the second carriage 12 without influencing the movement in the longitudinal direction A.

For decelerating the vertical or lateral movement of the second carriage 12 with respect to the first carriage 11, after the end of the crash simulation the push rod 18 and/or the second carriage 12 may be connected to a brake device (not shown). The brake device may be, for example, a reversible energy absorption element which is attached to the first carriage 11, on one side, and to the push rod 18 or the second carriage 12, on the other side. Of course, the brake device should only exert a braking effect on the push rod 18 or the second carriage 12 once the crash simulation has ended.

Despite this also not being explicitly shown in the figures, the test arrangement 1 may further have a third carriage which is configured to brake the movement of the second carriage 12 after the end of the crash simulation. The third carriage is arranged here in such a way with respect to the first and second carriages that at the start of the crash simulation it is not connected to the first and second carriages 11, 12 and only becomes operatively connected to the first and second carriages 11, 12 at the end of the crash simulation. The third carriage may be attached here for example on the same rail elements 111, 112 on which the first carriage 11 also is guided. After the end of the crash simulation, the third carriage may strike, for example, padding on a front region 123 of the second carriage 12, as a result of which at least the movement of the carriage arrangement along the longitudinal axis A is intercepted. In order to enable softer braking, the third carriage may be configured to be movable to a certain extent along the rail elements 111, 112 in the direction of the longitudinal axis A.

Moreover, it is particularly advantageous if the third carriage is configured to transfer the carriage arrangement back into the starting position after the end of the crash simulation. Specifically, the third carriage can accordingly be used to bring the carriage arrangement along the longitudinal axis A into the starting position and to simultaneously align the second carriage 12 with respect to the first carriage 11.

Finally, it should be mentioned that the first and second carriages 11, 12 are preferably produced mainly from aluminum, as a result of which the weight of the carriage arrangement is significantly reduced and the test arrangement 1 according to the invention can achieve far higher acceleration values.

LIST OF REFERENCE SIGNS

1 Test arrangement
11 First carriage
12 Second carriage
13 First actuating element
14a, 14b, 14c, 14d Second actuating element
15a, 15b, 15c, 15d Third actuating element
16a, 16b, 16c, 16d Guide rail
18 Push rod
50 Specimen assembly
111 Rail element
112 Rail element
121 Support element
122 Sliding element
123 Front region
131 Actuating piston
141a, 141b, 141c, 141d Pivot axis
181, 182 Ball joint/universal joint
A Longitudinal axis

The invention claimed is:

1. A test arrangement for the crash simulation of motor vehicles, said test arrangement having the following:
    a first carriage, which is movable substantially horizontally along a longitudinal axis (A),
    a second carriage, which is movable along the longitudinal axis (A) together with the first carriage, wherein the second carriage is attached to the first carriage
        in such an articulated manner that the second carriage is movable with respect to the first carriage,
    at least one first actuating element, which is configured to accelerate the first and second carriages along the longitudinal axis (A) of the first carriage,
    at least one second actuating element, which is configured to accelerate the second carriage in a substantially vertical direction with respect to the first carriage,
    wherein
    the test arrangement has at least one third actuating element, which is configured to accelerate the second carriage in a horizontal direction substantially perpendicular to the longitudinal axis (A).

2. The test arrangement as claimed in claim 1, wherein the at least one second actuating element is connected to the second carriage such that the second carriage is rotatable about a transverse axis perpendicular to the longitudinal axis (A) by activating the at least one second actuating element.

3. The test arrangement as claimed in claim 1, wherein the at least one third actuating element is connected to the second carriage such that the second carriage is rotatable about a vertical axis of the second carriage by activating the at least one third actuating element.

4. The test arrangement as claimed in claim 1, wherein the at least one second actuating element is arranged next to the first and second carriages such that the at least one second actuating element remains in its position while the first and second carriages are accelerated along the longitudinal axis (A) by the at least one first actuating element.

5. The test arrangement as claimed in claim 1, wherein the at least one third actuating element is arranged next to the first and second carriages such that the at least one third actuating element remains in its position while the first and second carriages are accelerated along the longitudinal axis (A) by the at least one first actuating element.

6. The test arrangement as claimed in claim 1, wherein the at least one second actuating element and the at least one third actuating element are connected to the second carriage via at least one guide rail, wherein the at least one guide rail extends substantially parallel to the longitudinal axis (A) of the first carriage.

7. The test arrangement as claimed in claim 6, wherein the at least one second actuating element is connected to the at least one guide rail and configured to accelerate the at least one guide rail in a substantially vertical direction with respect to the first carriage.

8. The test arrangement as claimed in claim 7, wherein the at least one third actuating element is connected to the at least one guide rail and configured to accelerate the at least one guide rail in a horizontal direction substantially perpendicular to the longitudinal axis (A).

9. The test arrangement as claimed in claim 1, wherein the at least one first actuating element, the at least one second actuating element and the at least one third actuating element each have at least one hydraulic, pneumatic or electric actuating cylinder.

10. The test arrangement as claimed in claim 1, wherein the second carriage is connected to the first carriage in an articulated manner via a push rod, and wherein the push rod is configured to transmit the acceleration of the first actuating element along the longitudinal axis (A) from the first carriage to the second carriage.

11. The test arrangement as claimed in claim 10, wherein the push rod is connected to the first and second carriages in each case via an articulation arrangement such that the acceleration of the first actuating element is transmissible from the first carriage to the second carriage while the second carriage is substantially freely movable with respect to the first carriage.

12. The test arrangement as claimed in claim 10, wherein the push rod and/or the second carriage is/are connected to a brake device for decelerating a vertical or lateral movement of the second carriage with respect to the first carriage after the end of the crash simulation.

13. The test arrangement as claimed in claim 1, wherein the test arrangement also has a third carriage, which is configured to brake the movement of the second carriage after the end of the crash simulation, wherein the third carriage is arranged in such a way with respect to the first and second carriages that at the start of the crash simulation it is not connected to the first and second carriages and only becomes operatively connected to the first and second carriages at the end of the crash simulation.

14. The test arrangement as claimed in claim 13, wherein the third carriage is configured to transfer the first and/or second carriage into the starting position after the end of the crash simulation.

15. The test arrangement as claimed in claim 1, wherein the first and second carriages are produced mainly from aluminum.

* * * * *